United States Patent
Onuki

(10) Patent No.: US 12,081,157 B2
(45) Date of Patent: Sep. 3, 2024

(54) INVERTER CONTROL METHOD AND INVERTER CONTROLLER

(71) Applicant: HONDA MOTOR CO., LTD., Tokyo (JP)

(72) Inventor: Yasumichi Onuki, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 144 days.

(21) Appl. No.: 17/679,150

(22) Filed: Feb. 24, 2022

(65) Prior Publication Data

US 2022/0321037 A1   Oct. 6, 2022

(30) Foreign Application Priority Data

Mar. 31, 2021  (JP) ................................ 2021-059876

(51) Int. Cl.
| | |
|---|---|
| *H02P 6/14* | (2016.01) |
| *H02M 7/5395* | (2006.01) |
| *H02P 6/08* | (2016.01) |
| *H02P 27/08* | (2006.01) |

(52) U.S. Cl.
CPC .......... *H02P 6/085* (2013.01); *H02M 7/5395* (2013.01); *H02P 27/08* (2013.01)

(58) Field of Classification Search
CPC ........ H02P 6/085; H02P 27/08; H02M 7/5395
USPC .................................................. 318/400.26
See application file for complete search history.

(56) References Cited

U.S. PATENT DOCUMENTS

| | | | | |
|---|---|---|---|---|
| 11,658,600 | B2* | 5/2023 | Yamasaki | ................ H02P 6/28 |
| | | | | 318/599 |
| 2012/0074888 | A1* | 3/2012 | Maekawa | ............... H02P 27/08 |
| | | | | 318/400.36 |
| 2014/0077738 | A1* | 3/2014 | Iwaji | ...................... H02P 21/04 |
| | | | | 318/400.36 |
| 2015/0075195 | A1* | 3/2015 | Suzuki | ..................... H02P 6/28 |
| | | | | 62/157 |
| 2018/0219469 | A1* | 8/2018 | Yamashita | ........ H02M 7/53871 |
| 2019/0131904 | A1* | 5/2019 | Aoki | ................ H02M 7/53871 |
| 2019/0334452 | A1* | 10/2019 | Hattori | ............... H02M 7/5387 |

FOREIGN PATENT DOCUMENTS

JP   2718058   2/1998

OTHER PUBLICATIONS

Sato, et al. "Novel PWM control method of voltage source 3-phase inverter to reduce common mode noise", The Papers of Joint Technical Meeting on "Semiconductor Power Converter" and "Motor Drive", IEEE Japan, pp. 67-72, 2021.

* cited by examiner

*Primary Examiner* — Erick D Glass
(74) *Attorney, Agent, or Firm* — Amin, Turocy & Watson, LLP

(57) ABSTRACT

In a two-phase modulation type three-phase inverter control method having a pause section in which a pulse signal obtained by comparing a modulated wave signal for driving a motor and a carrier signal is not output, a pulse signal generation unit switches a first carrier signal to a second carrier signal when an electric angle of the motor is within the pause section for each of three phases.

9 Claims, 15 Drawing Sheets

INVERTER CONTROL METHOD AND INVERTER CONTROLLER

CROSS-REFERENCE TO RELATED APPLICATION

Priority is claimed on Japanese Patent Application No. 2021-059876, filed Mar. 31, 2021, the content of which is incorporated herein by reference.

BACKGROUND OF THE INVENTION

Field of the Invention

The present invention relates to an inverter control method and an inverter controller.

Description of Related Art

As a pulse width modulation (PWM) control method for a three-phase voltage type inverter used when driving a three-phase motor at a variable speed, a three-arm modulation type has been widely used from the past (for example, see Patent Document 1 below). FIG. 14 is a circuit diagram showing a basic circuit of a general three-phase PWM voltage type inverter. In the three-arm modulation type shown in FIG. 14, each of three arms (a combination of switching elements Q901 and Q902, a combination of switching elements Q903 and Q904, and a combination of switching elements Q905 and Q906) obtains a desired output voltage by switching twice in total in such a manner that each of upper and lower arms performs switching within one carrier wave period.

In such a three-phase PWM voltage type inverter, common mode noise propagated through a ground wire is generated by a potential fluctuation with respect to a ground with switching due to charging and discharging of a stray capacitance existing between a main path and a ground or in a transformer. As a technique for reducing such common mode noise, a technique described in Non-Patent Document 1 is known as below. FIG. 15 is a diagram showing a carrier wave and a voltage reference signal in the three-phase PWM voltage type inverter of the technique described in Non-Patent Document 1. The waveform diagram g901 is a waveform of a U-phase output voltage eU, the waveform diagram g902 is a waveform of a V-phase output voltage eV, the waveform diagram g903 is a waveform of a W-phase output voltage eW, and the graph g904 is a graph of an electric angle as time changes. In the waveform diagram g901 to the waveform diagram g903 and the graph g904, the horizontal axis is the time. In the waveform diagram g901 to the waveform diagram g903, the vertical axis is the voltage. In the graph g904, the vertical axis is the electric angle (deg). FIG. 16 is a diagram showing a PWM signal and a voltage reference signal of the three-phase PWM voltage type inverter of the technique described in Non-Patent Document 1. A waveform diagram g921 is a waveform of a U-phase H-side PWM output signal UH, a waveform diagram g922 is a waveform of a V-phase H-side PWM output signal VH, and a waveform diagram g923 is a waveform of a W-phase H-side PWM output signal WH.

In the waveform diagram g921 to the waveform diagram g923, the horizontal axis is the time. In the waveform diagram g921 to the waveform diagram g923, the vertical axis is the voltage. In FIG. 15, triangular waves g911, g913, and g915 are carrier signals (carrier waves). In FIGS. 15 and 16, the waveforms g912, g914, and g916 are the waveforms of the voltage reference signals of respective phases. In FIG. 16, the waveforms g931, g932, and g933 are the waveforms of the PWM signals of respective phases.

In the technique described in Non-Patent Document 1, as shown in FIGS. 15 and 16, the carrier signal of one of the two phases to be modulated is inverted from C to C' (or from C' to C) during a PWM signal output period. The carrier signal C and the carrier signal C' are positive/negative inverted triangular wave signals. A section in which the PWM signal is not output (for example, the time t902 to t903 at the electric angle of 210 to 330° for U) is a pause section.

[Patent Document 1] Japanese Patent No. 2718058
[Non-Patent Document 1] Shinji Sato, Fumiki Kato, et al., "PWM control of voltage type three-phase inverter to reduce common mode noise", The Institute of Electrical Engineers of Japan Study Group Materials. MD/Motor Drive Study Group [ed.], 2021 No. 1-14, p 67-72, 2021

SUMMARY OF THE INVENTION

However, in the related art, the PWM duty fluctuates at the switching point of the carrier signal (for example, the time t902 in FIG. 11 in the W phase). Since a voltage pulse width is temporarily extended or shortened due to the fluctuation of the PWM duty, in the related art, the output power of the inverter is disturbed, and over/under power occurs.

An aspect of the present invention is made in view of such circumstances and an object thereof is to provide an inverter control method and an inverter controller for preventing a duty of a pulse signal from fluctuating.

In order to solve the above problems and achieve the above object, the present invention has adopted the following aspects.

(1) An inverter control method according to an aspect of the present invention is a two-phase modulation type three-phase inverter control method having a pause section in which a pulse signal obtained by comparing a modulated wave signal for driving a motor and a carrier signal is not output, wherein a pulse signal generation unit switches the first carrier signal to the second carrier signal when an electric angle of the motor is within the pause section for each of three phases.

(2) An inverter control method according to an aspect of the present invention is a two-phase modulation type three-phase inverter control method having a pause section in which a pulse signal obtained by comparing a modulated wave signal for generating three-phase AC power with a carrier signal is not output, wherein a pulse signal generation unit switches the first carrier signal to the second carrier signal when an electric angle of the three-phase AC power is within the pause section for each of three phases.

(3) In the aspect (1) or (2), the inside of the pause section may be a predetermined angle.

(4) In the aspect (1) or (2), the inside of the pause section may be a middle point of the pause section.

(5) In any one of the aspects (1) to (4), the first carrier signal and the second carrier signal may be positive/negative inverted triangular wave signals.

(6) In any one of the aspects (1) to (5), the pause section may have the electric angle in the range of 120°.

(7) In any one of the aspects (1) to (5), the pause section may have the electric angle in the range of 60°.

(8) An inverter controller according to an aspect of the present invention is a two-phase modulation type three-phase inverter controller having a pause section in which a pulse signal obtained by comparing a modulated wave signal for driving a motor with a carrier signal is not output, including: a motor angle detection unit configured to detect an electric angle of the motor; and a pulse signal generation unit configured to switch the first carrier signal to the second carrier signal when the detected electric angle of the motor is within the pause section for each of three phases.

(9) An inverter controller according to an aspect of the present invention is a two-phase modulation type three-phase inverter controller having a pause section in which a pulse signal obtained by comparing a modulated wave signal for generating three-phase AC power with a carrier signal is not output, including: an electric angle detection unit configured to detect an electric angle of the three-phase AC power; and a pulse signal generation unit configured to switch a first carrier signal to a second carrier signal when the detected electric angle of the three-phase AC power is within the pause section for each of three phases.

According to the aspects (1) to (9), it is possible to prevent the fluctuation in the duty of the pulse signal by switching the carrier signal when the electric angle of the motor is within the pause section. According to the aspects (1) to (9), it is possible to reduce the common mode noise.

DETAILED DESCRIPTION OF THE INVENTION

Hereinafter, embodiments of an inverter control method and an inverter controller of the present invention will be described with reference to the drawings. The inverter controller of each embodiment is a two-phase modulation type three-phase inverter having a pause in PWM output (see Non-Patent Document 1).

Figure 1:
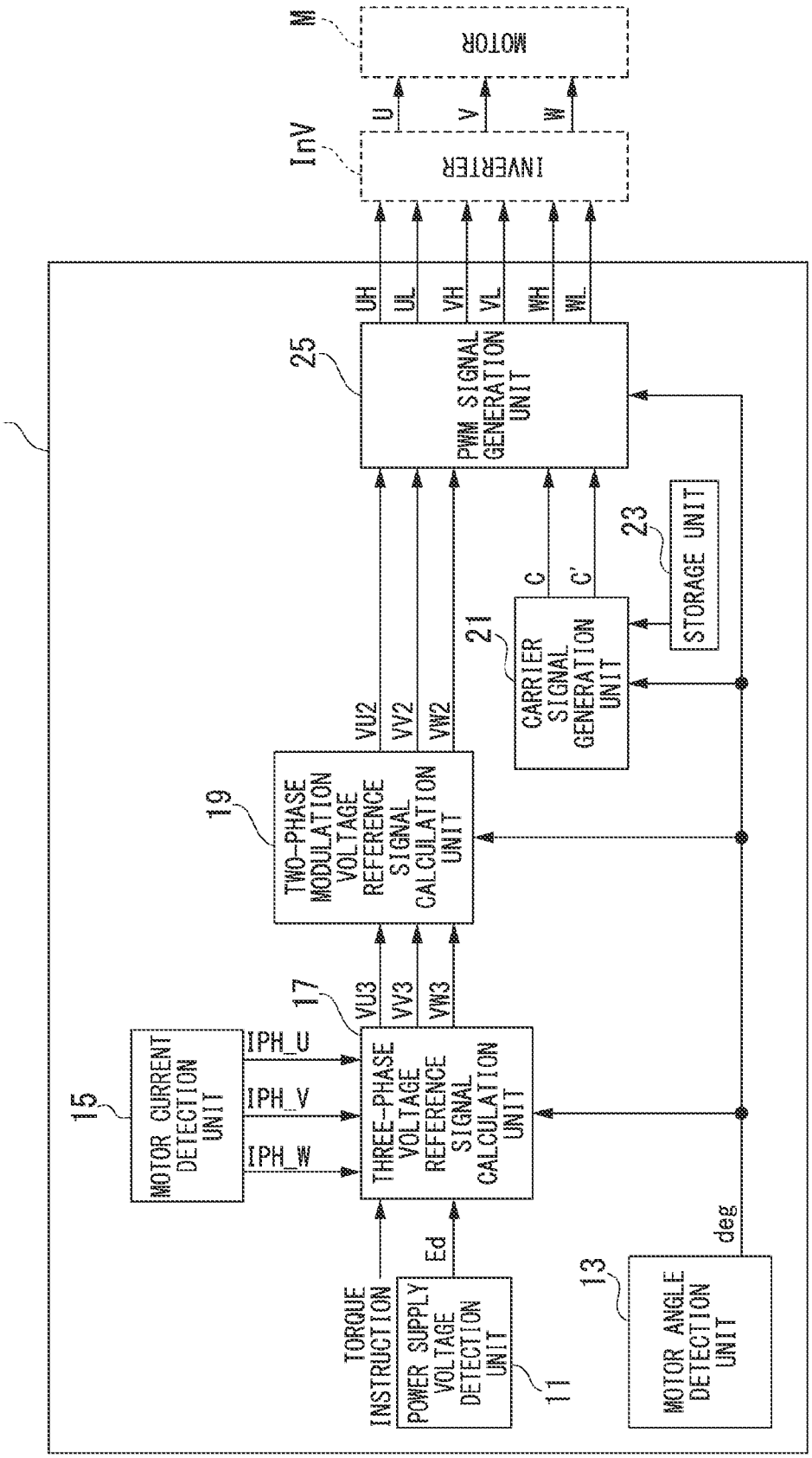
FIG. 1 is a block diagram showing a configuration example of an inverter controller according to an embodiment.

FIG. 1 is a block diagram showing a configuration example of the inverter controller according to this embodiment. As shown in FIG. 1, an inverter controller 1 includes a power supply voltage detection unit 11, a motor angle detection unit 13, a motor current detection unit 15, a three-phase voltage reference signal calculation unit 17, a two-phase modulation voltage reference signal calculation unit 19, a carrier signal generation unit 21, a storage unit 23, and a PWM signal generation unit 25 (pulse signal generation unit).

The inverter controller 1 drives a three-phase (U, V, W) motor M via a three-phase inverter Inv.

The power supply voltage detection unit 11 detects a power supply voltage value of the inverter controller 1 and outputs the detected power supply voltage value Ed to the three-phase voltage reference signal calculation unit 17.

The motor angle detection unit 13 detects an angle (deg) of an electric angle of a motor M and outputs the detected electric angle of the motor M to the three-phase voltage reference signal calculation unit 17, the two-phase modulation voltage reference signal calculation unit 19, the carrier signal generation unit 21, and the PWM signal generation unit 25.

The motor current detection unit 15 detects a current value (IPH_U, IPH_V, IPH_W) of each phase of the motor M and outputs the detected current value of each phase to the three-phase voltage reference signal calculation unit 17.

The three-phase voltage reference signal calculation unit 17 calculates a three-phase voltage reference signal (VU3, VV3, VW3) of each phase according to a known method from a current value of each phase of the motor M, a torque instruction value from an external device, and the angle of the motor M detected by the motor angle detection unit 13. The three-phase voltage reference signal VU3 is a U-phase signal, the three-phase voltage reference signal VV3 is a V-phase signal, and the three-phase voltage reference signal VW3 is a W-phase signal. The three-phase voltage reference signal calculation unit 17 outputs the calculated three-phase voltage reference signal of each phase to the two-phase modulation voltage reference signal calculation unit 19.

The two-phase modulation voltage reference signal calculation unit 19 calculates a two-phase voltage reference signal (VU2, VV2, VW2) (modulated wave signal) according to a known method from the three-phase voltage reference signal of each phase using the angle of the motor M detected by the motor angle detection unit 13. The two-phase voltage reference signal VU2 is a U-phase signal, the two-phase voltage reference signal VV2 is a V-phase signal, and the two-phase voltage reference signal VW2 is a W-phase signal. The two-phase modulation voltage reference signal calculation unit 19 outputs the calculated two-phase voltage reference signal to the PWM signal generation unit 25. As will be described later, the two-phase modulation voltage reference signal is a signal in which one phase is always fixed at a low level in the entire section and only two phases are always modulated in the entire section. The modulated wave signal is used for comparison with a carrier signal, and is, for example, a modulated wave signal for driving a motor or a modulated wave signal for generating three-phase AC power.

The carrier signal generation unit 21 generates a carrier signal (for example, a triangular wave signal) C (a first carrier signal or a second carrier signal) and a carrier signal C' (a second carrier signal or a first carrier signal) by using the information stored in the storage unit 23 and the angle of the motor M detected by the motor angle detection unit 13. The carrier signals C and C' are signals whose positive and negative are inverted. The carrier signal generation unit 21 outputs the generated carrier signals C and C' to the PWM signal generation unit 25. The inverter controller 1 determines the PWM switching frequency by changing the carrier signal. "Switching from the first carrier signal to the second carrier signal" corresponds to "switching from the carrier signal C to the carrier signal C'" and "switching from the carrier signal C' to the carrier signal C".

The storage unit 23 stores, for example, a predetermined motor angle which is a timing for switching the carrier signal of each phase. The timing for switching the carrier signal is the pause section of each phase.

The PWM signal generation unit 25 generates a PWM output signal (UH, UL, VH, VL, WH, WL) of each phase for driving the motor M on the basis of the carrier signals C and C' and the two-phase voltage reference signal (VU2, VV2, VW2). The PWM output signal UH is a U-phase high-level signal and the PWM output signal UL is a U-phase low-level signal. The PWM output signal VH is a V-phase high-level signal and the PWM signal VL is a V-phase low-level signal. The PWM signal WH is a W-phase high-level signal and the PWM output signal WL is a W-phase low-level signal. The PWM signal generation unit 25 switches the carrier signals C and C' every 360° in a section of 120° in which the switching is paused. The section of 120° in which the switching is paused is a pause section in which the PWM signal is not output.

As described above, the inverter controller 1 includes a power supply voltage detection unit 11, a motor angle detection unit 13, a motor current detection unit 15, a three-phase voltage reference signal calculation unit 17, a two-phase modulation voltage reference signal calculation unit 19, a carrier signal generation unit 21, and a PWM signal generation unit 25. These components are realized by, for example, a hardware processor such as a central processing unit (CPU) executing a program (software). Some or all of these components may be realized by hardware such as a large scale integration (LSI), an application specific integrated circuit (ASIC), a field-programmable gate array (FPGA), and a graphics processing unit (GPU) (circuit part; including circuitry) or a combination of software and hardware. The program may be stored in advance in a storage device (a storage device including a non-transient storage medium) such as a hard disk drive (HDD) or a flash memory or may be stored in a removable storage medium (non-transient storage medium) such as a DVD or a CD-ROM and may be installed by attaching the storage medium to a drive device. The software may be pre-installed, supplied by a storage device such as a flash memory, supplied via the Internet or the like, or may be in the cloud.

Figure 2:
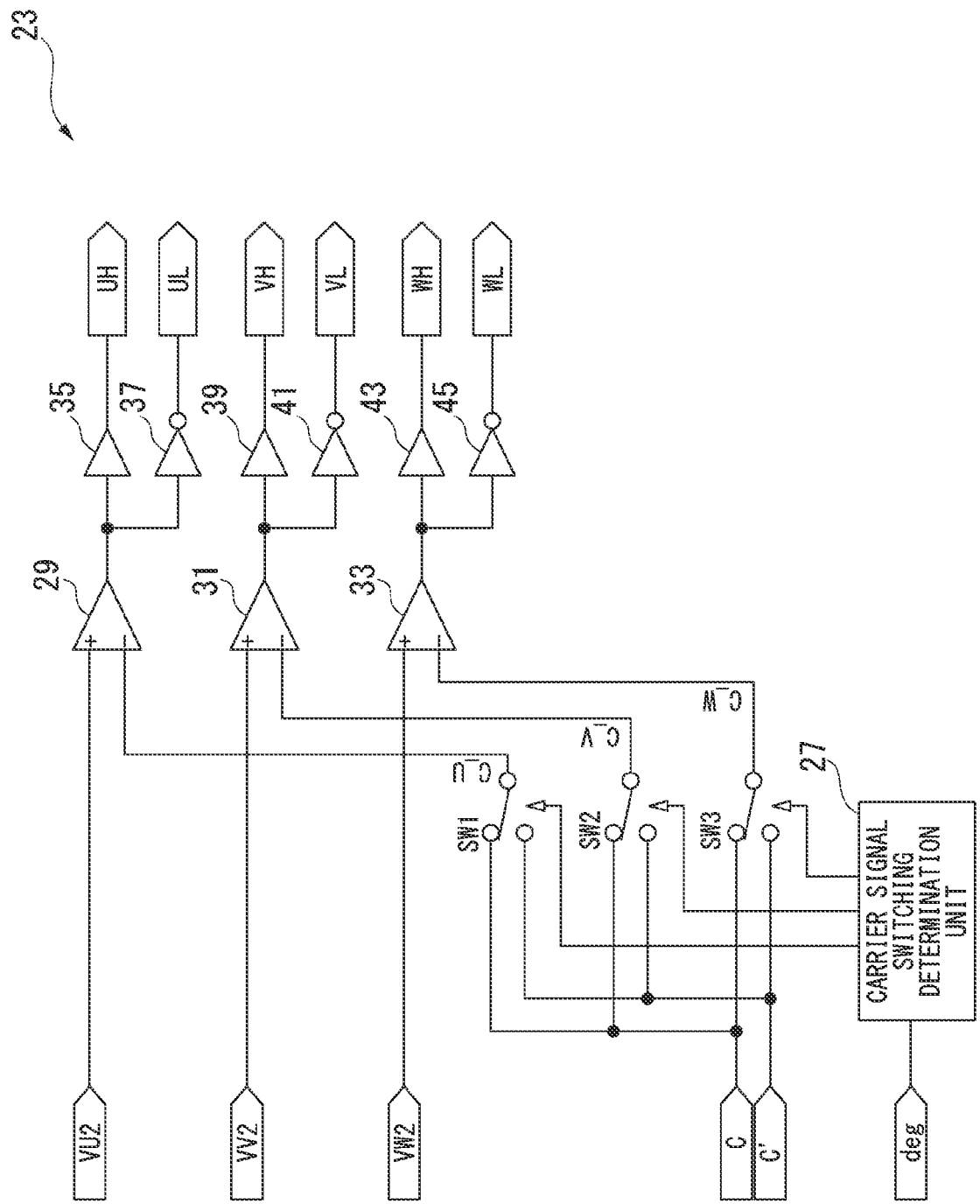
FIG. 2 is a circuit diagram showing a configuration example of a PWM signal generation unit according to the embodiment.

Next, a configuration example of the PWM signal generation unit 25 will be described. FIG. 2 is a circuit diagram showing a configuration example of the PWM signal generation unit according to this embodiment. As shown in FIG. 2, the PWM signal generation unit 25 includes, for example, a carrier signal switching determination unit 27, a switch SW1, a switch SW2, a switch SW3, a comparator 29, a comparator 31, a comparator 33, a buffer 35, an inverter 37, a buffer 39, an inverter 41, a buffer 43, and an inverter 45. The circuit configuration shown in FIG. 2 is an example and is not limited thereto.

The carrier signal switching determination unit 27 receives the motor angle (deg) detected by the motor angle detection unit 13. The carrier signal switching determination unit 27 generates a U-phase switching signal for switching the carrier signal when the motor angle matches a predetermined motor angle for a U phase stored in the storage unit 23 and outputs the generated U-phase switching signal to a control terminal of the switch SW1. The carrier signal switching determination unit 27 generates a V-phase switching signal for switching the carrier signal when the motor angle matches a predetermined motor angle for a V phase stored in the storage unit 23 and outputs the generated V phase switching signal to a control terminal of the switch SW2. The carrier signal switching determination unit 27 generates a W-phase switching signal for switching the carrier signal when the motor angle matches a predetermined motor angle for a W phase stored in the storage unit 23 and outputs the generated W phase switching signal to a control terminal of the switch SW3. The predetermined motor angle may be an angle such as 90° or a range from 90 to 210°.

The carrier signal C is supplied to a first input terminal of each of the switch SW1 to the switch SW3. The carrier signal C' is supplied to a second input terminal of each of the switch SW1 to the switch SW3. The switch SW1 switches the carrier signals C and C' according to the U-phase switching signal and outputs a switched carrier signal C_U to a negative input of the comparator 29. The switch SW2 switches the carrier signals C and C' according to the V-phase switching signal and outputs a switched carrier signal C_V to a negative input of the comparator 31. The switch SW3 switches the carrier signals C and C' according to the W-phase switching signal and outputs a switched carrier signal C_W to a negative input of the comparator 33.

The two-phase voltage reference signal VU2 is input to a positive input of the comparator 29. The comparator 29 compares the two-phase voltage reference signal VU2 with the carrier signal C_U and outputs a high-level signal when the two-phase voltage reference signal VU2 is larger than the carrier signal C_U. The buffer 35 outputs the high-level PWM output signal UH when the output of the comparator 29 is a high level. When the output of the comparator 29 is a high level, the inverter 37 inverts the signal and outputs the low-level PWM output signal UL.

The two-phase voltage reference signal VV2 is input to a positive input of the comparator 31. The comparator 31 compares the two-phase voltage reference signal VV2 with the carrier signal C_V and outputs a high-level signal when the two-phase voltage reference signal VV2 is larger than the carrier signal C_V. The buffer 39 outputs the high-level PWM output signal VH when the output of the comparator 31 is a high level. When the output of the comparator 31 is a high level, the inverter 41 inverts the signal and outputs the low-level PWM output signal VL.

The two-phase voltage reference signal VW2 is input to a positive input of the comparator 33. The comparator 33 compares the two-phase voltage reference signal VW2 with the carrier signal C_W and outputs the high-level signal when the two-phase voltage reference signal VW2 is larger than the carrier signal C_W. The buffer 43 outputs the high-level PWM output signal WH when the output of the comparator 33 is a high level. When the output of the comparator 33 is a high level, the inverter 45 inverts the signal and outputs the low-level PWM output signal WL.

Figure 3:
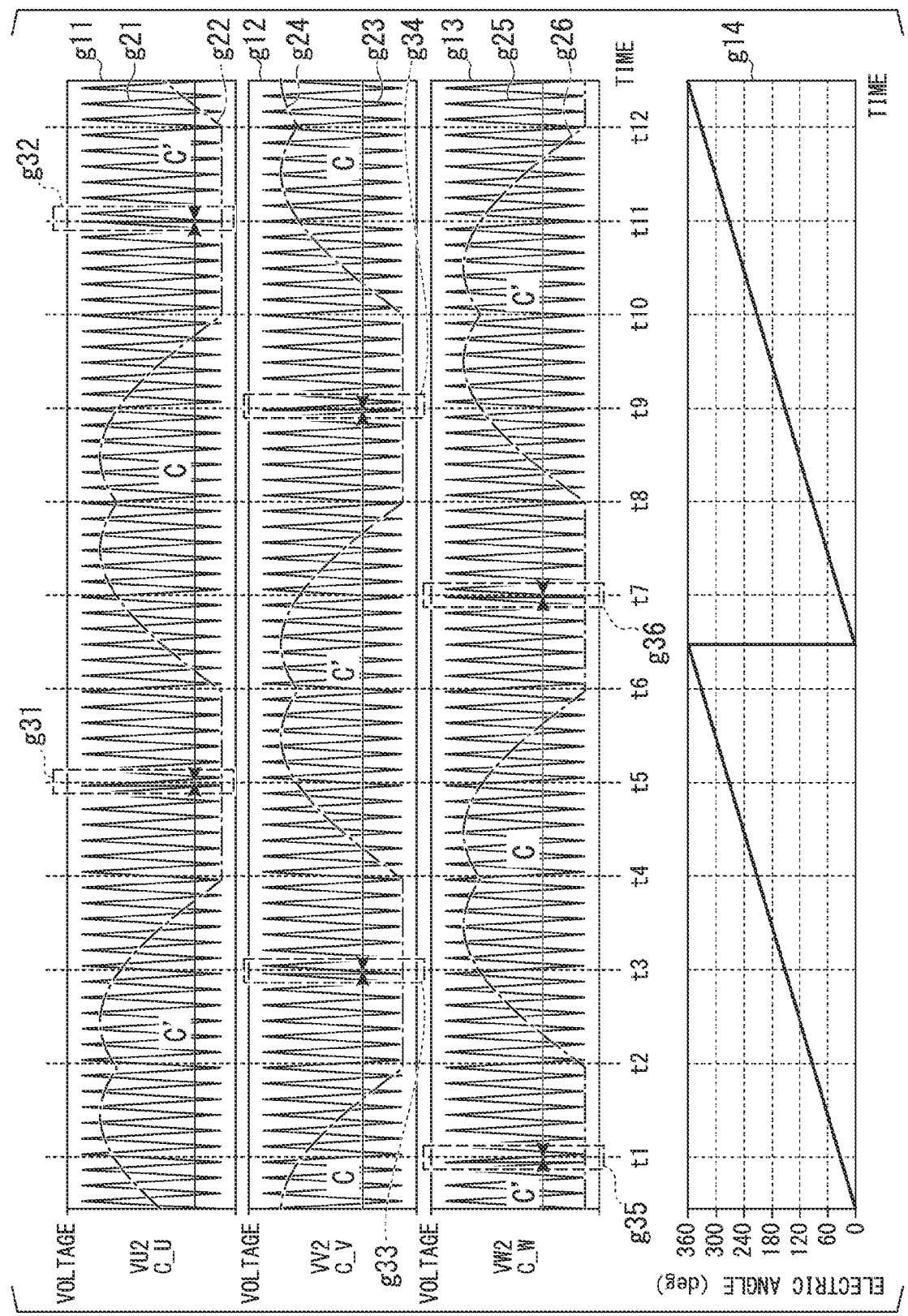
FIG. 3 is a diagram showing a relationship of a switching timing of a carrier signal of each phase, a two-phase voltage reference signal, and an electric angle according to the embodiment.

Next, a relationship of the switching timing of the carrier signal of each phase and the two-phase voltage reference signal will be described. FIG. 3 is a diagram showing a relationship of the switching timing of the carrier signal of each phase, the two-phase voltage reference signal, and the electric angle according to this embodiment. A graph g11 is a waveform example of the U-phase carrier signal C_U (g21) and the two-phase voltage reference signal VU2 (g22). A graph g12 is a waveform example of the V-phase carrier signal C_V (g23) and the two-phase voltage reference signal VV2 (g24). A graph g13 is a waveform example of the W-phase carrier signal C_W (g25) and the two-phase voltage reference signal VW2 (g26). A graph g14 is a change in the electric angle. In the graphs g11 to g14, the horizontal axis is the time. In the graphs g11 to g13, the vertical axis is the voltage. In the graph g14, the vertical axis is the electric angle (deg).

As shown in the graph g11, in the U phase, the carrier signal is switched, for example, at the timing of the time t5 (g31) and t11 (g32) at the electric angle of 270°. As a result, in the carrier signal C_U (g21), a period up to the time t5 at the electric angle of 270° is the carrier signal C', a period up to the time t5 to t11 at the electric angle of 270 to 360 to 270° is the carrier signal C, and a period after the time t11 at the electric angle of 270° is the carrier signal C'.

As shown in the graph g12, in the V phase, the carrier signal is switched, for example, at the timing of the time t3 (g33) and t9 (g34) at the electric angle of 150°. As a result, in the carrier signal C_V (g23), a period up to the time t3 at the electric angle of 150° is the carrier signal C, a period up to the time t3 to t9 at the electric angle of 150 to 360 to 150° is the carrier signal C', and a period after the time t9 at the electric angle of 150° is the carrier signal C.

As shown in the graph g13, in the W phase, the carrier signal is switched, for example, at the timing of the time t1 (g35) and t7 (g36) at the electric angle of 30°. As a result, in the carrier signal C_W (g25), a period up to the time t1 at the electric angle of 30° is the carrier signal C', a period up to the time t1 to t7 at the electric angle of 30 to 360 to 30° is the carrier signal C, and a period after the time t7 at the electric angle of 30° is the carrier signal C'.

Figure 4:
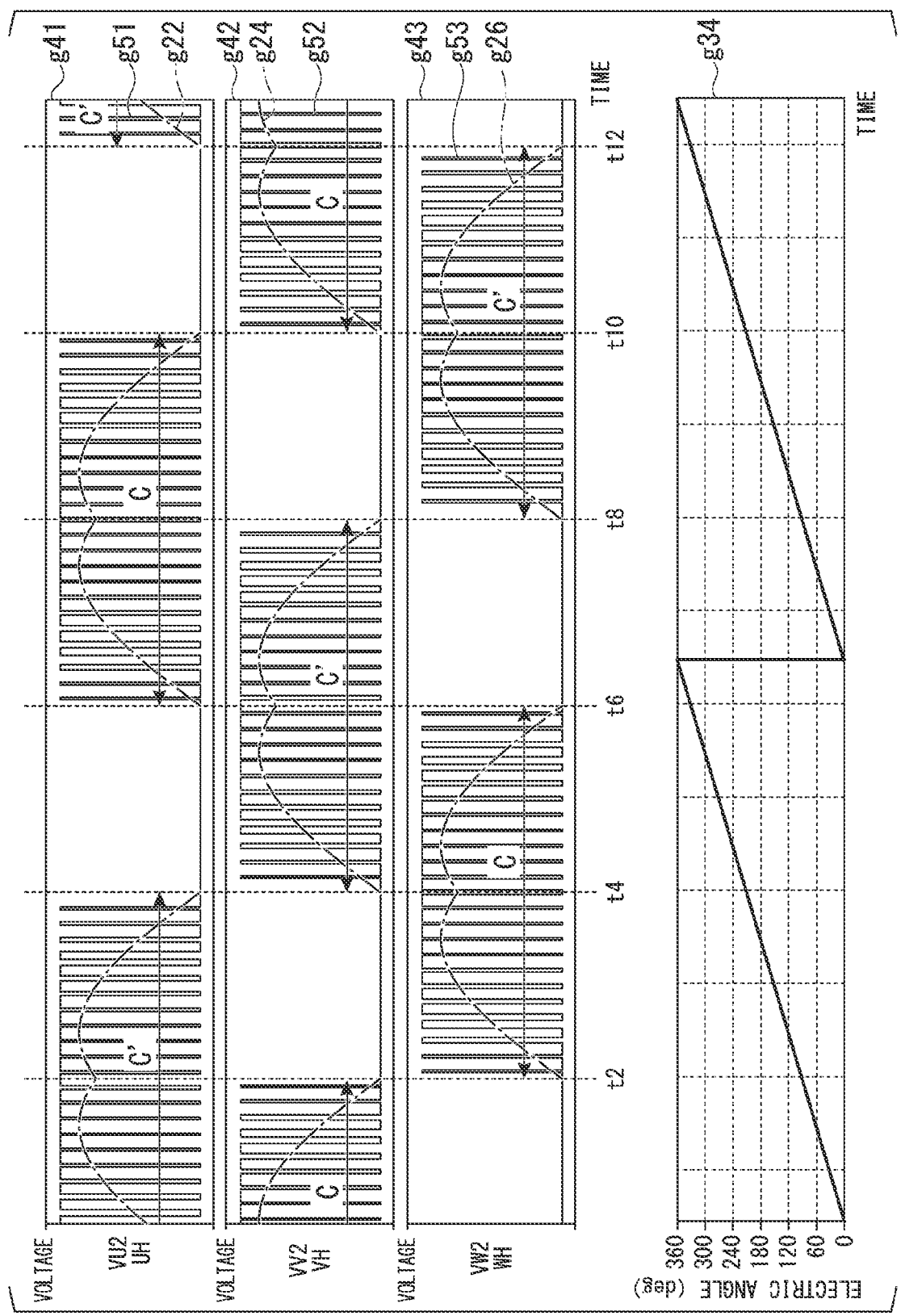
FIG. 4 is a diagram showing a relationship of a two-phase voltage reference signal of each phase and a high-level side output signal according to the embodiment.

Next, a relationship of the two-phase voltage reference signal of each phase and the high-level side output signal will be described. FIG. 4 is a diagram showing a relationship of the two-phase voltage reference signal of each phase and the high-level side output signal according to this embodiment. A graph g41 is a waveform example of the U-phase two-phase voltage reference signal VU2 (g22) and the high-level side PWM output signal UH (g51). A graph g42 is a waveform example of the V-phase two-phase voltage reference signal VV2 (g24) and the high-level side PWM output signal VH (g52). A graph g43 is a waveform example of the W-phase two-phase voltage reference signal VW2 (g26) and the high-level side output signal WH (g53). In the graphs g41 to g43, the horizontal axis is the time and the vertical axis is the voltage.

As shown in FIG. 4, the inverter controller 1 is a two-phase modulation type three-phase inverter in which one phase is always fixed at a low level in the entire section and only two phases are always modulated in the entire section and which is paused at 120°.

As shown in the graph g41, the output section of the high-level side PWM output signal UH (g51) is up to the time t4 at the electric angle of 210° and the sections of the time t4 to t6 and t10 to t12 at the electric angle of 210 to 330° are the pause section. As shown in the graph g42, in the V-phase carrier signal, the output section of the high-level side output signal UV (g52) is up to the time t2 at the electric angle of 90° and the sections of the time t2 to t4 and t8 to t10 at the electric angle of 90 to 210° are the pause sections. As shown in the graph g43, in the W-phase carrier signal, the output section of the high-level side output signal UW (g53) is the sections of the time t2 to t6 and t8 to t12 at the electric angle of 90 to 330° and the sections up to the time t2 and t6 to t8 at the electric angle of 330 to 360 to 90° are the pause sections. As shown in the graphs g11 to g13 of FIG. 3, the carrier signals of the U, V, and W phases are switched in this pause section.

In this way, in this embodiment, the carrier signal is switched every 360° in the section (pause section) of 120° where switching is paused.

As a result, according to this embodiment, since switching does not occur during the switching operation, the PWM duty does not fluctuate as in the graphs g41 to g43.

Figure 15:
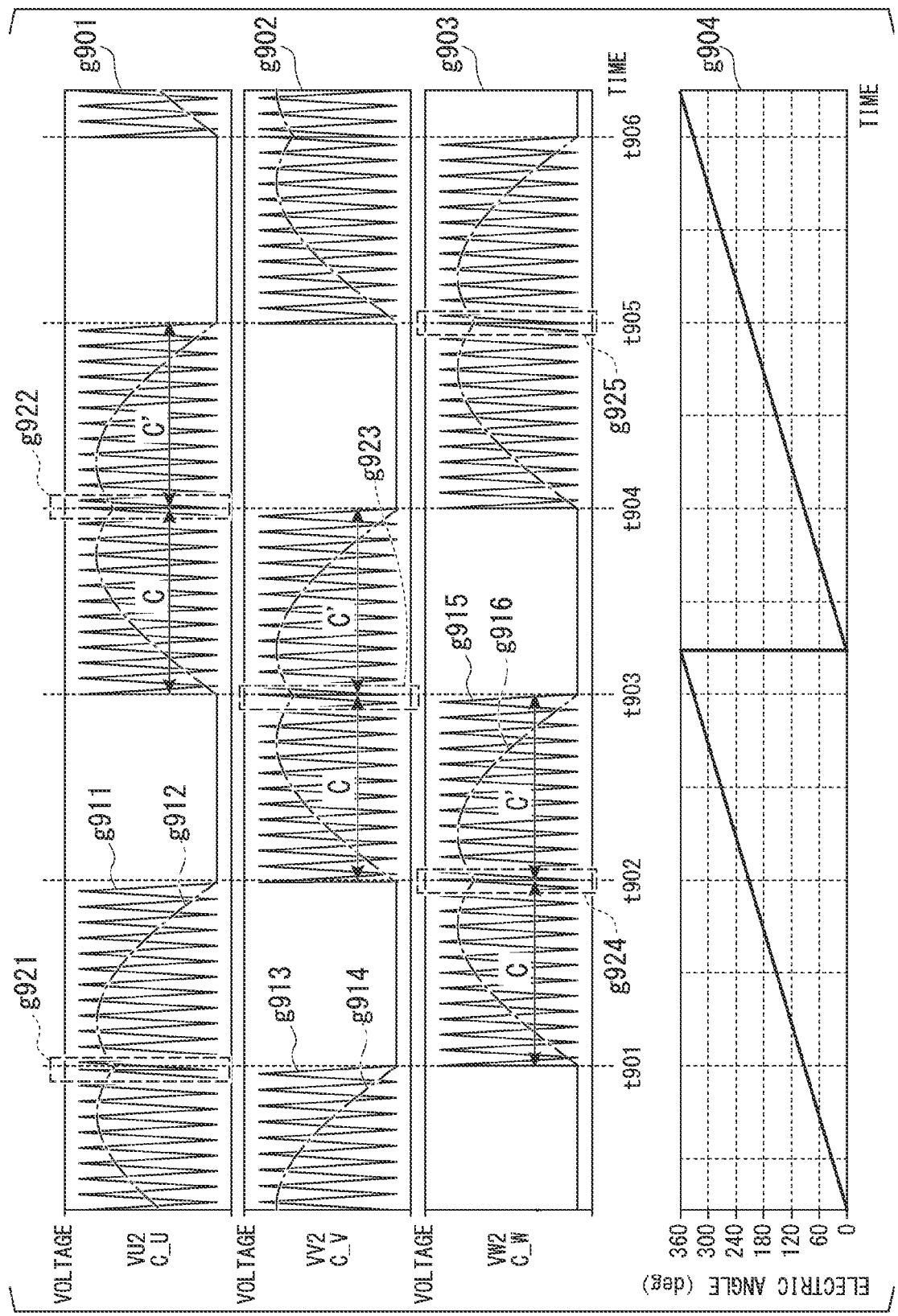
FIG. 15 is a diagram showing a carrier wave and a voltage reference signal in a three-phase PWM voltage type inverter described in Non-Patent Document 1.
Figure 16:
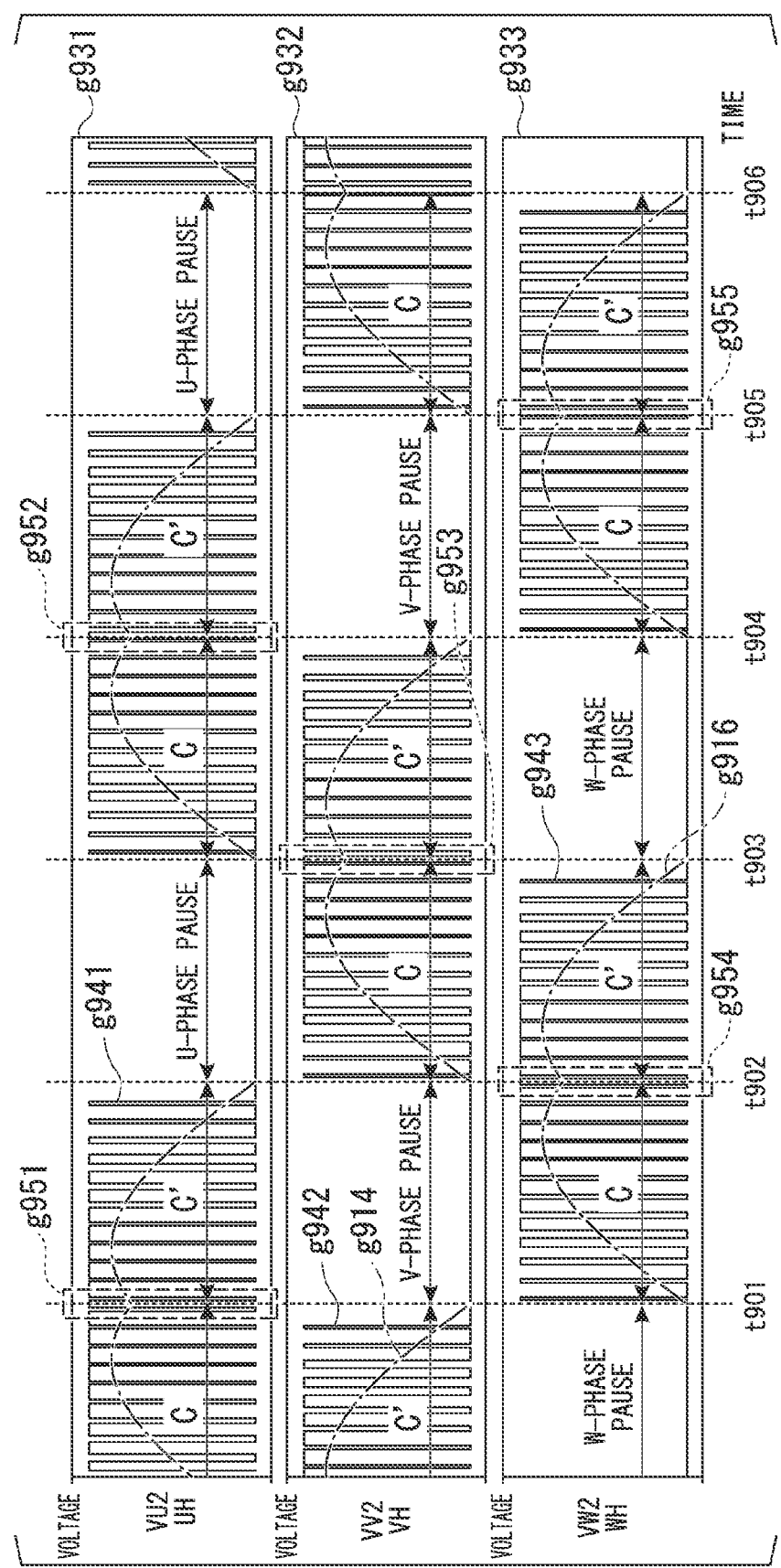
FIG. 16 is a diagram showing a PWM signal and a voltage reference signal in the three-phase PWM voltage type inverter described in Non-Patent Document 1.

On the other hand, in the related art, the carrier signal is switched during switching as shown in the graphs g901 to g903 of FIG. 15. Therefore, in the related art, there is a problem that the PWM duty fluctuates as shown in the graphs g931 to g933 of FIG. 16. According to this embodiment, this problem can be solved and the PWM duty can be prevented from fluctuating.

Figure 5:
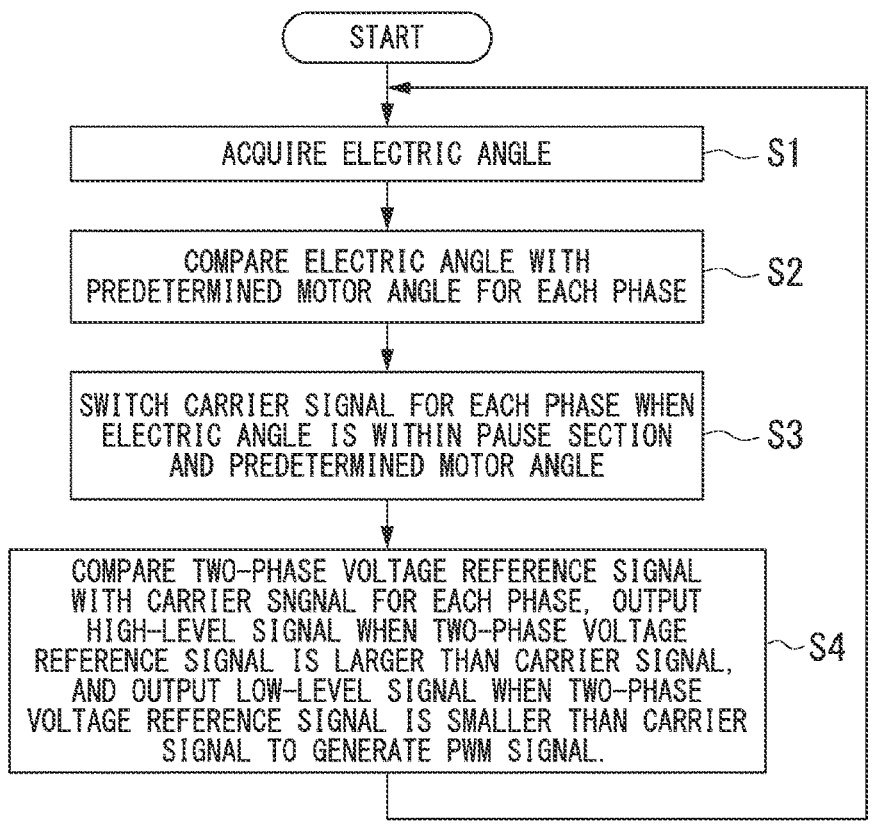
FIG. 5 is a flowchart showing an example of a control procedure of a PWM signal generation unit according to the embodiment.

Next, an example of a control procedure of the inverter controller 1 will be described. FIG. 5 is a flowchart showing an example of a control procedure of the PWM signal generation unit according to this embodiment.

The PWM signal generation unit 25 acquires the motor angle detected by the motor angle detection unit 13 (step S1).

The PWM signal generation unit 25 compares a predetermined motor angle stored in the storage unit 23 with an acquired electric angle for each phase (step S2).

The PWM signal generation unit 25 switches the carrier signal for each phase when the electric angle is within the pause section and the predetermined motor angle (step S3).

The PWM signal generation unit 25 compares the two-phase voltage reference signal VU2 with the carrier signal for each phase, outputs the high-level signal when the two-phase voltage reference signal is larger than the carrier signal, and outputs the low-level signal when the two-phase voltage reference signal is smaller than the carrier signal (step S4). The PWM signal generation unit 25 subsequently repeats the processes of steps S1 to S4.

First Example

The inverter controller 1 of the first example is a two-phase modulation type three-phase inverter in which a PWM output pause section is 120°. The timing for switching the carrier signal by the PWM signal generation unit 25 of the first example may be within the pause section. For example, in FIG. 3, the PWM signal generation unit 25 switches the carrier signal for the U phase within the pause section at the electric angle of 210 to 330° every 360°, switches the carrier signal for the V phase within the pause section at the electric angle of 90 to 210° every 360°, and switches the carrier signal for the W phase within the pause section at the electric angle of 330 to 360 to 90° every 360°.

Figure 6:
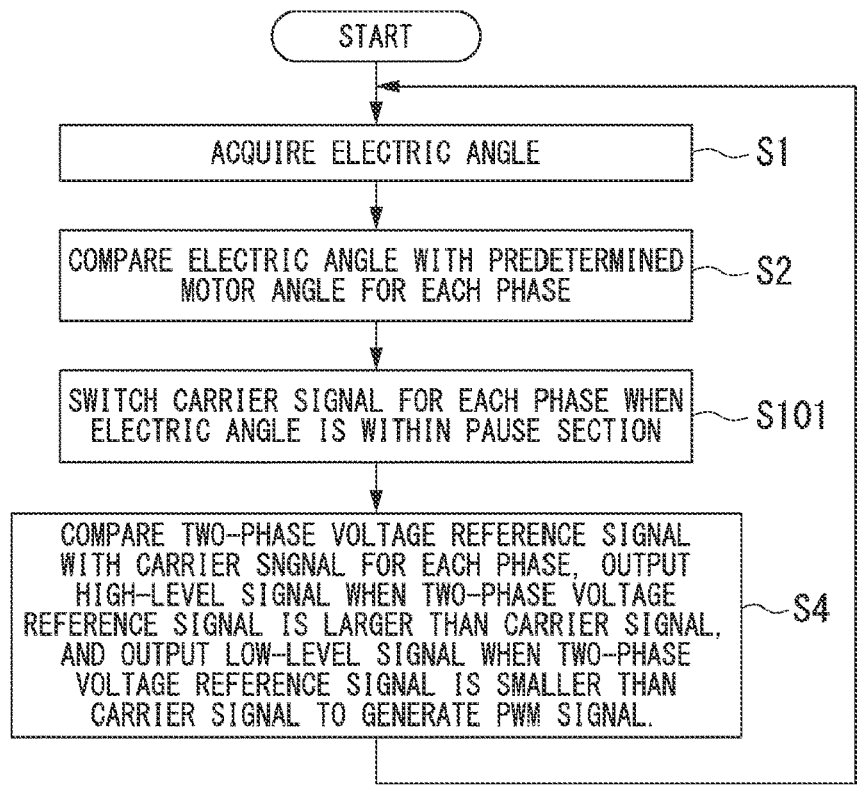
FIG. 6 is a flowchart showing an example of a control procedure of a PWM signal generation unit according to a first example.

FIG. 6 is a flowchart showing an example of a control procedure of the PWM signal generation unit of the first example. In the first example, the PWM signal generation unit 25 switches the carrier signal for each phase when the electric angle is within the pause section (step S101).

Second Example

The inverter controller 1 of the second example is a two-phase modulation type three-phase inverter in which a PWM output pause section is 120°. The timing for switching the carrier signal by the PWM signal generation unit 25 of the second example may be the middle point of the pause section. For example, in FIG. 3, the PWM signal generation unit 25 switches the U-phase carrier signal every 360° when the electric angle at the middle point of the pause section at the electric angle of 210 to 330° is 270°. The PWM signal generation unit 25 switches the V-phase carrier signal every 360° when the electric angle at the middle point of the pause section at the electric angle of 90 to 210° is 150°. The PWM signal generation unit 25 switches the W-phase carrier signal every 360° when the electric angle in the middle of the pause section at the electric angle of 330 to 360 to 90° is 30°.

Figure 7:
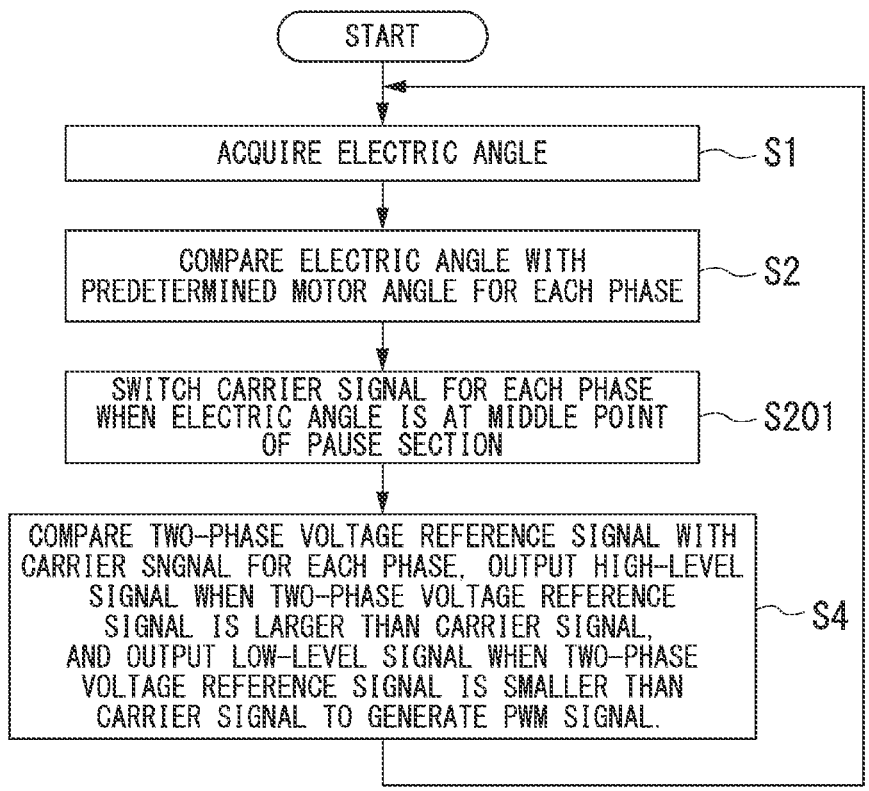
FIG. 7 is a flowchart showing an example of a control procedure of a PWM signal generation unit according to a second example.

FIG. 7 is a flowchart showing an example of a control procedure of the PWM signal generation unit of the second example. In the second example, the PWM signal generation unit 25 switches the carrier signal for each phase when the electric angle is the middle point of the pause section (step S201).

Third Example

Figure 8:
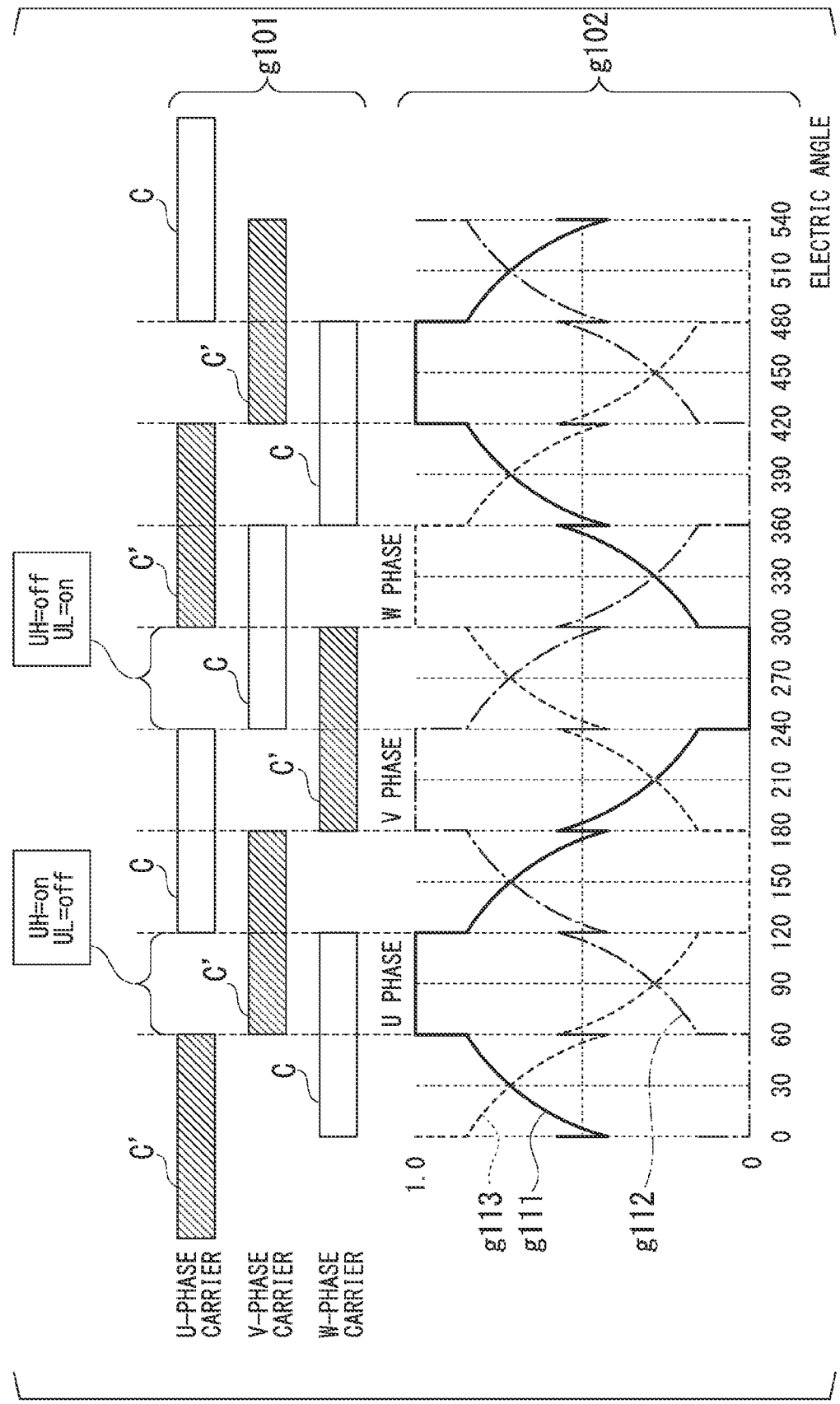
FIG. 8 is a diagram showing an operation example of a two-phase modulation type three-phase inverter in which a PWM output pause section is 60°.

The inverter controller 1 of the third example is a two-phase modulation type three-phase inverter in which a PWM output pause section is 60°. FIG. 8 is a diagram showing an operation example of the two-phase modulation type three-phase inverter in which the PWM output pause section is 60°. This is an example of a two-phase modulation in a vertical type. As in the carrier state and the pause section g101, in the U phase, the section of the angle of −60 to 60° is the carrier signal C', the section of 120 to 240° is the carrier signal C, and the section of 60 to 120° and the section of 240 to 300° are the pause sections. In the output to the motor M in the pause section of 60 to 120°, the PWM output signal UH is in an on state and the PWM output signal UL is in an off state. In the output to the motor M in the pause section of 240 to 300°, the PWM output signal UH is in an off state and the PWM output signal UL is in an on state. In this way, the output state in the pause section is switched with the inversion of the carrier signal.

In the V phase, the section of the angle of 60 to 180° is the carrier signal C', the section of 240 to 360° is the carrier signal C, and the section of 180 to 240° is the pause sections. In the W phase, the section of the angle of 0 to 120° is the carrier signal C, the section of 180 to 300° is the carrier signal C', and the section of 120 to 180° is the pause section.

A graph g102 is a phase input voltage waveform in the case of the two-phase modulation in the vertical type. A waveform g111 is a U-phase waveform, a waveform g112 is a V-phase waveform, and a waveform g113 is a W-phase waveform (see Reference Document 1 and Patent Document 1).

Reference Document 1: Toshiba Electronic Devices & Storage Corporation, "Inverter Circuit (DC/AC Conversion) Application Note", [online], 2018, Toshiba Electronic Devices & Storage Corporation, [Search on Mar. 16, 2021], <URL: https://toshiba.semicon-storage.com/info/docget.jsp?did=61545>

Even when such a pause section is 60°, the inverter controller 1 can be applied. In this case, the PWM signal generation unit 25 switches the carrier signal in the pause section of each phase. The switching timing of the carrier signal may be within the pause section as in the first example and in the middle of the pause section as in the second example.

(Evaluation Result)

Figure 9:
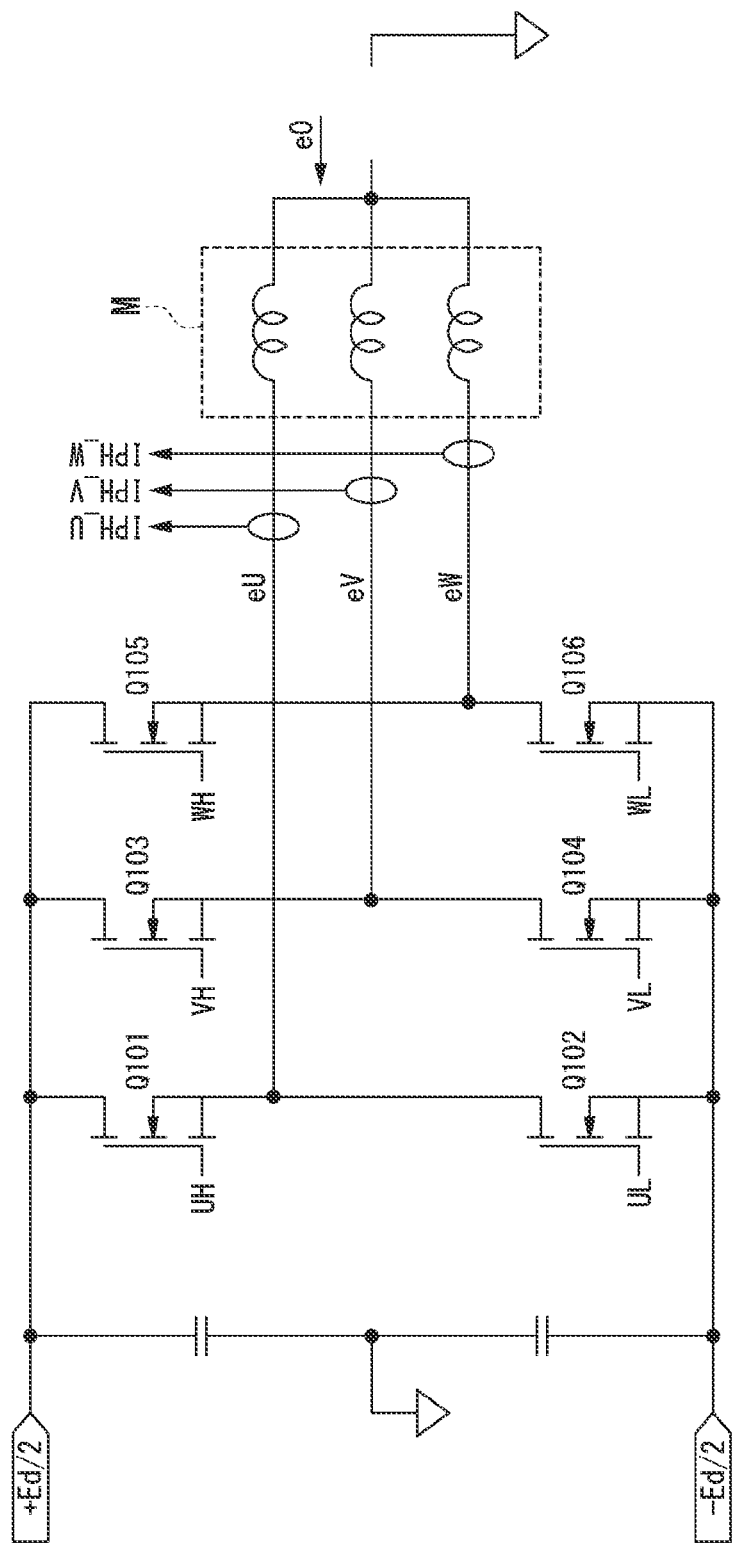
FIG. 9 is a diagram showing a three-phase inverter circuit, a three-phase motor, and a voltage e0.
Figure 14:
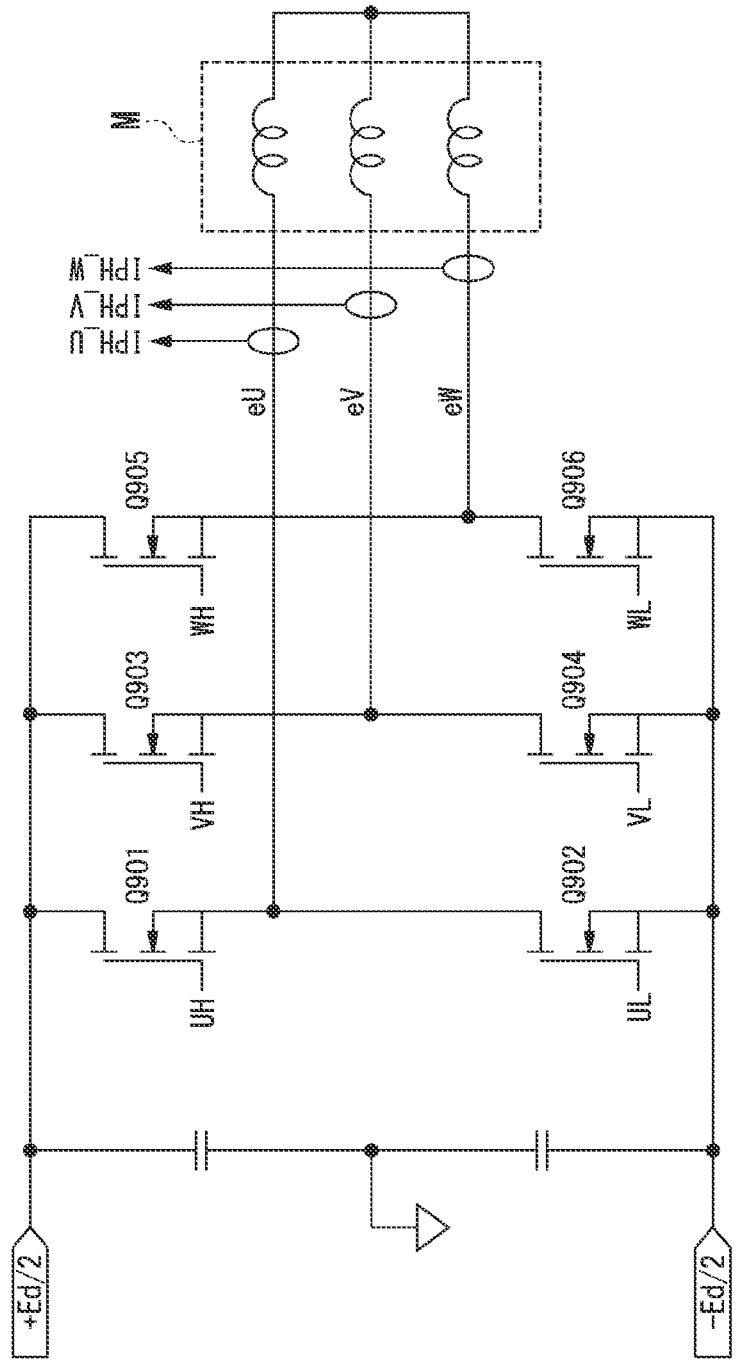
FIG. 14 is a circuit diagram showing a basic circuit of a general three-phase PWM voltage type inverter.

Next, a result example obtained by evaluating the common mode noise in the inverter controller 1 of the first example will be described. FIG. 9 is a diagram showing the three-phase inverter circuit, the three-phase motor, and the voltage e0. The configurations of the three-phase inverter circuit and the three-phase motor are the same as those of FIG. 14. As shown in FIG. 9, the voltage e0 used in the following description is the voltage between the middle dotted line of the Y connection of the three-phase winding of the motor M and the ground.

Figure 10:
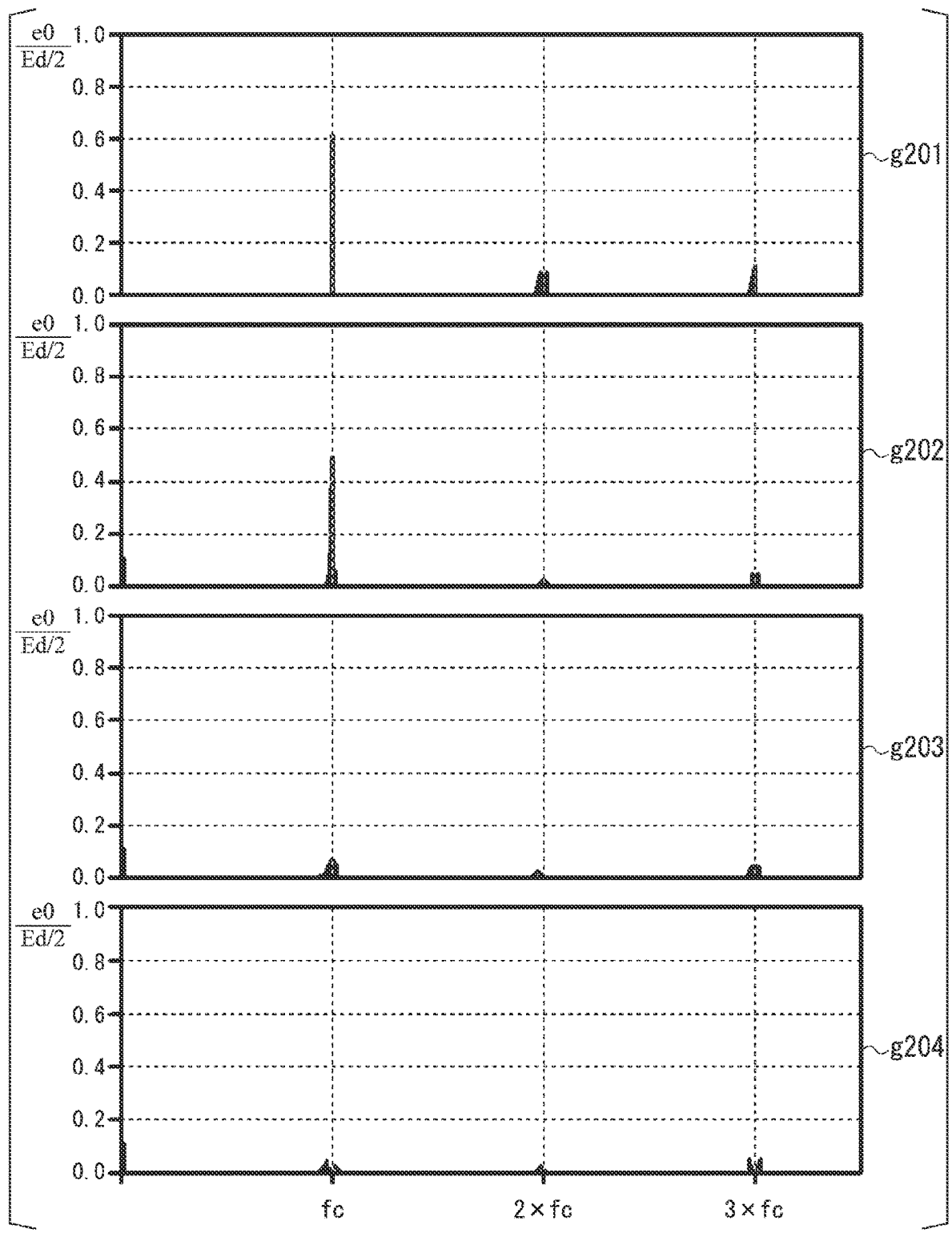
FIG. 10 is a diagram showing a frequency component of a common mode voltage e0 in a conventional sine wave PWM, a conventional 120-degree pause type PWM without carrier switching, an inverter controller of a first example of this embodiment, and a PWM according to a method described in Non-Patent Document 1.

FIG. 10 is a diagram showing the frequency component of the common mode voltage e0 in the conventional sine wave PWM, the conventional 120-degree pause type PWM without carrier switching, the inverter controller of the first example of this embodiment, and the PWM according to the method described in Non-Patent Document 1. A graph g201 is the frequency component of the common mode voltage e0 of the conventional sine wave PWM. A graph g202 is the frequency component of the common mode voltage e0 of the conventional 120-degree pause type PWM without carrier switching. A graph g203 is the frequency component of the common mode voltage e0 of the inverter controller of the first example. A graph g204 is the frequency component of the common mode voltage e0 of the PWM according to the method described in Non-Patent Document 1. In the graphs g201 to g204, the horizontal axis is the frequency and the vertical axis is the normalized signal level e0/(Ed/2).

As shown in FIG. 10, the frequency component of the carrier frequency (fc) is about 0.6 in the drive type according to the conventional sine wave PWM. On the other hand, according to the first example, the frequency signal level e0/(Ed/2) of the carrier frequency (fc) is equivalent to the method described in Non-Patent Document 1 and is almost 0.

Figure 11:
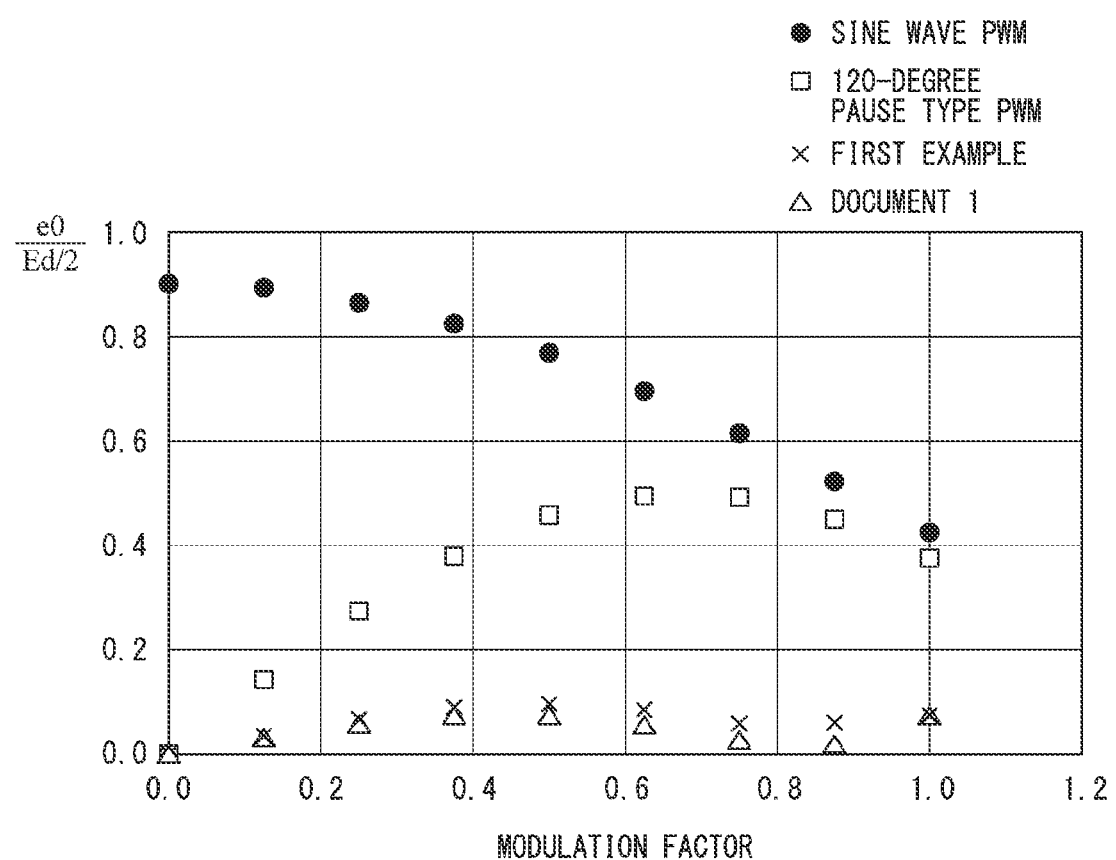
FIG. 11 is a diagram showing a relationship of a carrier signal frequency component superimposed on e0 with a modulation factor in the conventional sine wave PWM, the conventional 120-degree pause type PWM without carrier switching, the inverter controller of the first example of this embodiment, and the PWM according to the method described in Non-Patent Document 1.

FIG. 11 is a diagram showing a relationship of a carrier signal frequency component superimposed on e0 with a modulation factor in the conventional sine wave PWM, the conventional 120-degree pause type PWM without carrier switching, the inverter controller of the first example of this embodiment, and the PWM of the method described in Non-Patent Document 1. The horizontal axis is the modulation factor and the vertical axis is e0/(Ed/2). The black circle mark indicates the relationship of the carrier signal frequency component superimposed on e0 with the modulation factor in the conventional sine wave PWM. The white square mark indicates the relationship of the carrier signal frequency component superimposed on e0 with the modulation factor in the conventional 120-degree pause type PWM without carrier switching. The cross mark indicates the relationship of the carrier signal frequency component superimposed on e0 with the modulation factor in the inverter controller of the first example. The triangle mark indicates the relationship of the carrier signal frequency component superimposed on e0 with the modulation factor in the PWM of the technique described in Non-Patent Document 1. As shown in FIG. 10, in the conventional sine wave PWM and the conventional 120-degree pause type PWM, the carrier frequency component changes with a change in the modulation factor. However, according to the first example, the method is the same as that of Non-Patent Document 1 and the carrier frequency component is 0.1 or less even when the modulation factor changes. Thus, the carrier frequency component is not substantially changed and the PWM duty does not fluctuate.

Even in the second example, similarly to the first example, it is possible to reduce the common mode noise as in the related art described in Non-Patent Document 1.

Figure 12:
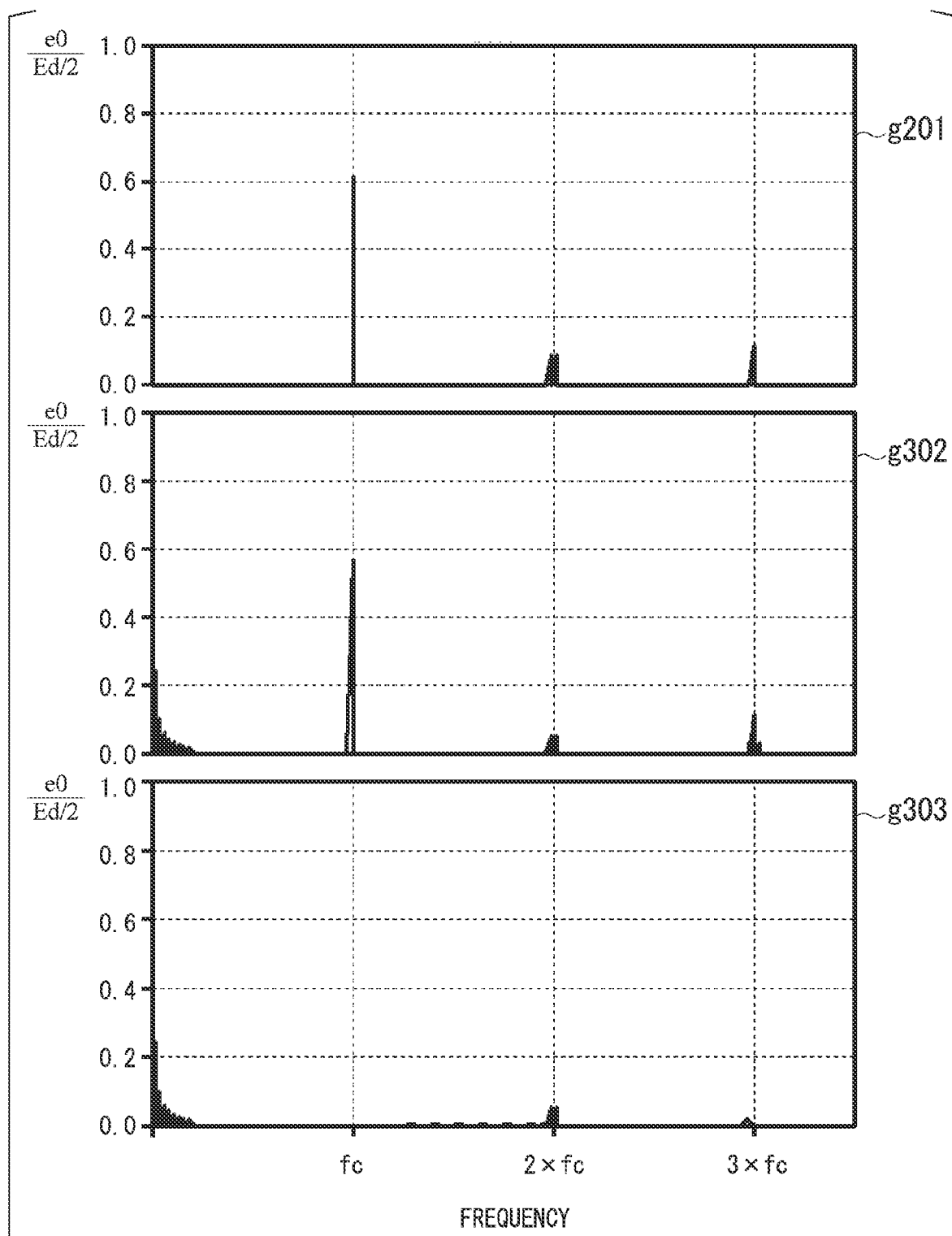
FIG. 12 is a diagram showing a frequency component of a common mode voltage e0 in a conventional sine wave PWM, a conventional 60-degree pause type PWM, and an inverter controller of a third example of this embodiment.

Next, a result example obtained by evaluating the common mode noise in the inverter controller 1 of the third example will be described. FIG. 12 is a diagram showing the frequency component of the common mode voltage e0 in the conventional sine wave PWM, the conventional 60-degree pause type PWM, and the inverter controller of the third example of this embodiment. A graph g201 is the frequency component of the common mode voltage e0 of the conventional sine wave PWM. A graph g302 is the frequency component of the common mode voltage e0 of the conventional 60-degree pause type PWM. A graph g303 is the frequency component of the common mode voltage e0 of the inverter controller of the third example. In the graphs g201 and g302 to g303, the horizontal axis is the frequency and the vertical axis is the normalized signal level e0/(Ed/2).

As shown in FIG. 12, the frequency component of the carrier frequency (fc) is about 0.6 in the drive type according to the conventional sine wave PWM. On the other hand, according to the third example, the frequency component of the carrier frequency (fc) is almost 0.

Figure 13:
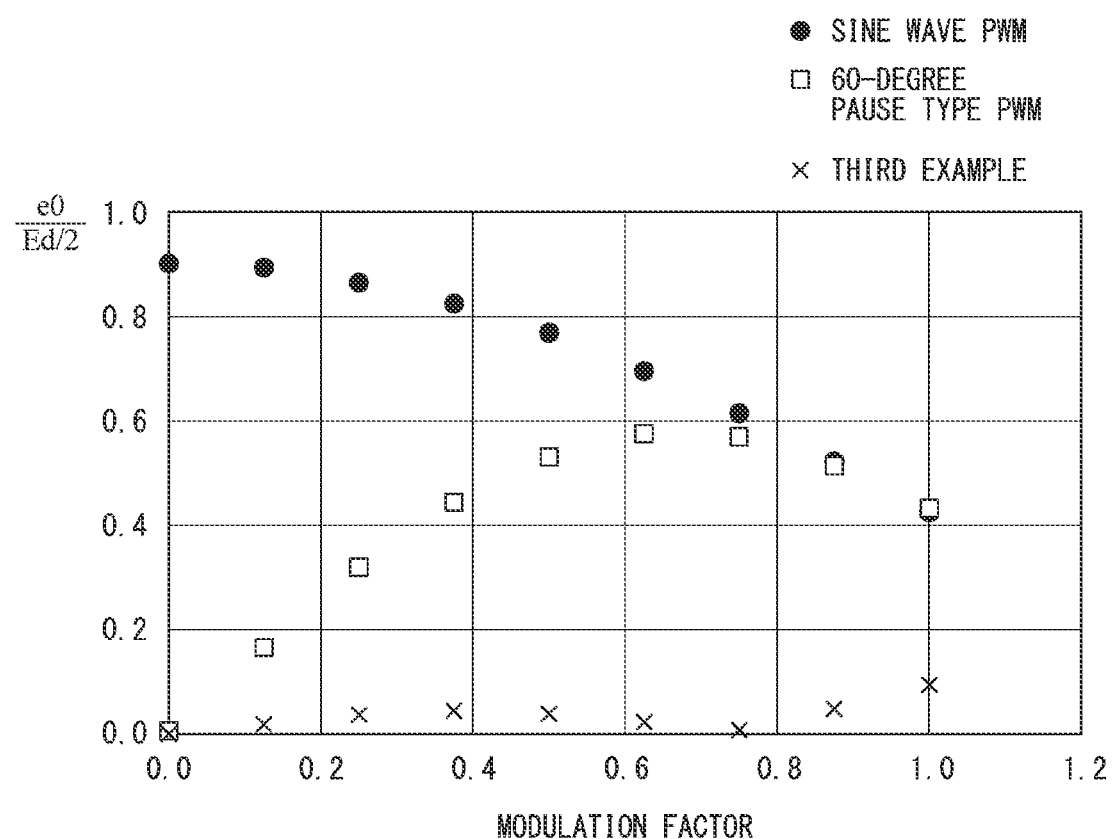
FIG. 13 is a diagram showing a relationship of a carrier signal frequency component superimposed on e0 with a modulation factor in the conventional sine wave PWM, the conventional 60-degree pause type PWM, and the inverter controller of the third example of this embodiment.

FIG. 13 is a diagram showing a relationship of a carrier signal frequency component superimposed on e0 with the modulation factor in the conventional sine wave PWM, the conventional 60-degree pause type PWM, and the inverter controller of the third example of this embodiment. The horizontal axis is the modulation factor and the vertical axis is e0/(Ed/2). The black circle mark indicates the relationship of the carrier signal frequency component superimposed on e0 with the modulation factor in the conventional sine wave PWM. The white square mark indicates the relationship of the carrier signal frequency component superimposed on e0 with the modulation factor in the conventional 60-degree pause type PWM. The cross mark indicates the relationship of the carrier signal frequency component superimposed on e0 with the modulation factor in the inverter controller of the third example. As shown in FIG. 13, the carrier frequency component changes with a change in the modulation factor in the conventional sine wave PWM and the conventional 60-degree pause type PWM. However, according to the third example, the carrier frequency component is 0.1 or less even when the modulation factor changes. Thus, the carrier frequency component is not substantially changed and the PWM duty does not fluctuate.

As described above, according to the examples of this embodiment, it is possible to reduce the common mode noise in the same manner as the method of switching the carrier signal in the PWM output section as in the technique described in Non-Patent Document 1. Further, according to this example, it is possible to prevent the PWM duty from fluctuating.

In the above-described embodiment and examples, an example in which the signal for driving the motor M is the PWM signal has been described, but the present invention is not limited thereto. The signal for driving the motor M may be other signals if it is the pulse signal. In the above-described embodiment and examples, an example in which the carrier signal is the triangular wave signal has been described, but the present invention is not limited thereto. The carrier signal may be, for example, other signals such as sine waves.

In the above-described embodiment and examples, an example in which the load connected to the inverter is the motor has been described, but the present invention is not limited thereto. For example, the inverter can be used for power supply to various electric devices operating with three-phase AC power and for reverse power flow to grid power.

Although the mode for carrying out the present invention has been described above using the embodiments, the present invention is not limited to these embodiments, and various modifications and substitutions can be added without departing from the gist of the present invention.

Appendix (I) An inverter controller according to an aspect is a two-phase modulation type three-phase inverter controller having a pause section in which a pulse signal obtained by comparing a modulated wave signal for driving a motor with a carrier signal is not output, including: a motor angle detection unit configured to detect an electric angle of the motor; and a pulse signal generation unit configured to switch the first carrier signal to the second carrier signal when the detected electric angle of the motor is within the pause section for each of three phases.

(II) An inverter controller according to an aspect is a two-phase modulation type three-phase inverter controller having a pause section in which a pulse signal obtained by comparing a modulated wave signal for generating three-phase AC power with a carrier signal is not output, including: an electric angle detection unit configured to detect an electric angle of the three-phase AC power; and a pulse signal generation unit configured to switch the first carrier signal to the second carrier signal when the detected electric angle of the three-phase AC power is within the pause section for each of three phases.

(III) In the aspect (I) or (II), the inside of the pause section is a predetermined angle.

(IV) In the aspect (I) or (II), the inside of the pause section is a middle point of the pause section.

(V) In any one of the aspects (I) to (IV), the first carrier signal and the second carrier signal are positive/negative inverted triangular wave signals.

(VI) In any one of the aspects (I) to (V), the pause section has the electric angle in the range of 120°.

(VII) In any one of the aspects (I) to (V), the pause section has the electric angle in the range of 120°.

(VIII) In any one of the aspects (I) to (VII), the pulse signal generation unit includes a carrier signal switching determination unit which generates a switching signal for switching the first carrier signal to the second carrier signal for each phase when the electric angle of the motor is within the pause section, a switch to which the first carrier signal and the second carrier signal are input and which is provided for each phase to switch the first carrier signal and the second carrier signal by the switching signal and output the carrier signal, and a comparator which is provided for each phase to compare the modulated wave signal with the carrier signal.

What is claimed is:

1. A two-phase modulation type three-phase inverter control method having a pause section in which a pulse signal obtained by comparing a modulated wave signal for driving a motor and a carrier signal is not output,
wherein a pulse signal generation unit switches a first carrier signal to a second carrier signal when an electric angle of the motor is within the pause section for each of three phases.

2. A two-phase modulation type three-phase inverter control method having a pause section in which a pulse signal obtained by comparing a modulated wave signal for generating three-phase AC power with a carrier signal is not output,
wherein a pulse signal generation unit switches a first carrier signal to a second carrier signal when an electric angle of the three-phase AC power is within the pause section for each of three phases.

3. The inverter control method according to claim 1, wherein the inside of the pause section is a predetermined angle.

4. The inverter control method according to claim 1, wherein the inside of the pause section is a middle point of the pause section.

5. The inverter control method according to claim 1, wherein the first carrier signal and the second carrier signal are positive/negative inverted triangular wave signals.

6. The inverter control method according to claim 1, wherein the pause section has the electric angle in a range of 120°.

7. The inverter control method according to claim 1, wherein the pause section has the electric angle in a range of 60°.

8. A two-phase modulation type three-phase inverter controller having a pause section in which a pulse signal obtained by comparing a modulated wave signal for driving a motor with a carrier signal is not output, comprising:
a motor angle detection unit configured to detect an electric angle of the motor; and
a pulse signal generation unit configured to switch a first carrier signal to a second carrier signal when the detected electric angle of the motor is within the pause section for each of three phases.

9. A two-phase modulation type three-phase inverter controller having a pause section in which a pulse signal obtained by comparing a modulated wave signal for generating three-phase AC power with a carrier signal is not output, comprising:
an electric angle detection unit configured to detect an electric angle of the three-phase AC power; and
a pulse signal generation unit configured to switch a first carrier signal to a second carrier signal when the detected electric angle of the three-phase AC power is within the pause section for each of three phases.

* * * * *